US00RE51125E

(19) United States
(12) Reissued Patent
Che

(10) Patent Number: US RE51,125 E
(45) Date of Reissued Patent: Nov. 17, 2026

(54) PUZZLE PLATFORM

(71) Applicant: Xiaoling Che, Dangyang (CN)

(72) Inventor: Xiaoling Che, Dangyang (CN)

(73) Assignee: Xiaoling Che, Dangyang (CN)

(21) Appl. No.: 29/991,153

(22) Filed: Feb. 27, 2025

Related U.S. Patent Documents

Reissue of:
(64) Patent No.: Des. 1,024,210
Issued: Apr. 23, 2024
Appl. No.: 29/818,458
Filed: Dec. 9, 2021

(30) Foreign Application Priority Data

Sep. 26, 2021 (CN) ..... 202111131554.1

(51) LOC (15) Cl. ..... 21-01
(52) U.S. Cl.
USPC ..... D21/397
(58) Field of Classification Search
USPC ..... D3/274, 297; D6/406.1, 406.2, 406.3, D6/406.4, 406.5, 406.6, 618, 641, 642, D6/685, 686, 691, 691.1, 707.19, 707.22; D7/550.1, 552.2, 553.1, 553.2; D21/397, D21/522, 783
CPC ..... A63F 1/06; A63F 1/067; A63F 9/1044; A63F 9/015; A63F 9/1055; A47B 25/00; A47B 23/00; A47B 23/043; A47B 27/00; A47B 2031/003; A47B 3/00; A47B 3/083
See application file for complete search history.

(56) References Cited

U.S. PATENT DOCUMENTS

D30,211 S * 2/1899 McNeil ..... D21/340
D32,838 S * 6/1900 Kolp ..... D21/340
(Continued)

FOREIGN PATENT DOCUMENTS

CN 203776378 U * 8/2014 ..... A47B 23/00

OTHER PUBLICATIONS

The Wayback Machine for the Website of "Bits and Pieces"—Puzzle Tables (ttps://web.archive.org/web/20200604153626/https://www.bitsandpieces.com/category/tables).

*Primary Examiner* — Darlington Ly
(74) *Attorney, Agent, or Firm* — AVEK IP, LLC

(57) CLAIM

The ornamental design for a puzzle platform, as shown and described.

DESCRIPTION

FIG. 1 is a rear perspective view of the puzzle platform showing my new design;
FIG. 2 is a front perspective view of the puzzle platform;
FIG. 3 is a front *elevation* view of the puzzle platform;
FIG. 4 is a rear *elevation* view of the puzzle platform;
FIG. 5 is a left *elevation* view of the puzzle platform;
FIG. 6 is a right *elevation* view of the puzzle platform;
FIG. 7 is a top *plan* view of the puzzle platform; *and,*
FIG. 8 is a bottom *plan* view of the puzzle platform[; and,].
[FIG. 9 is an enlarged view of the area labeled 9 in FIG. 1.]
[The dot-dash broken lines of the puzzle platform in FIG. 1 illustrate a boundary and cut line of the enlarged views in FIG. 9 that form no part of the claimed design.] *The dash-dash broken lines in the drawing depict portions of the puzzle platform that form no part of the claimed design.*

1 Claim, 9 Drawing Sheets

Figure 9:
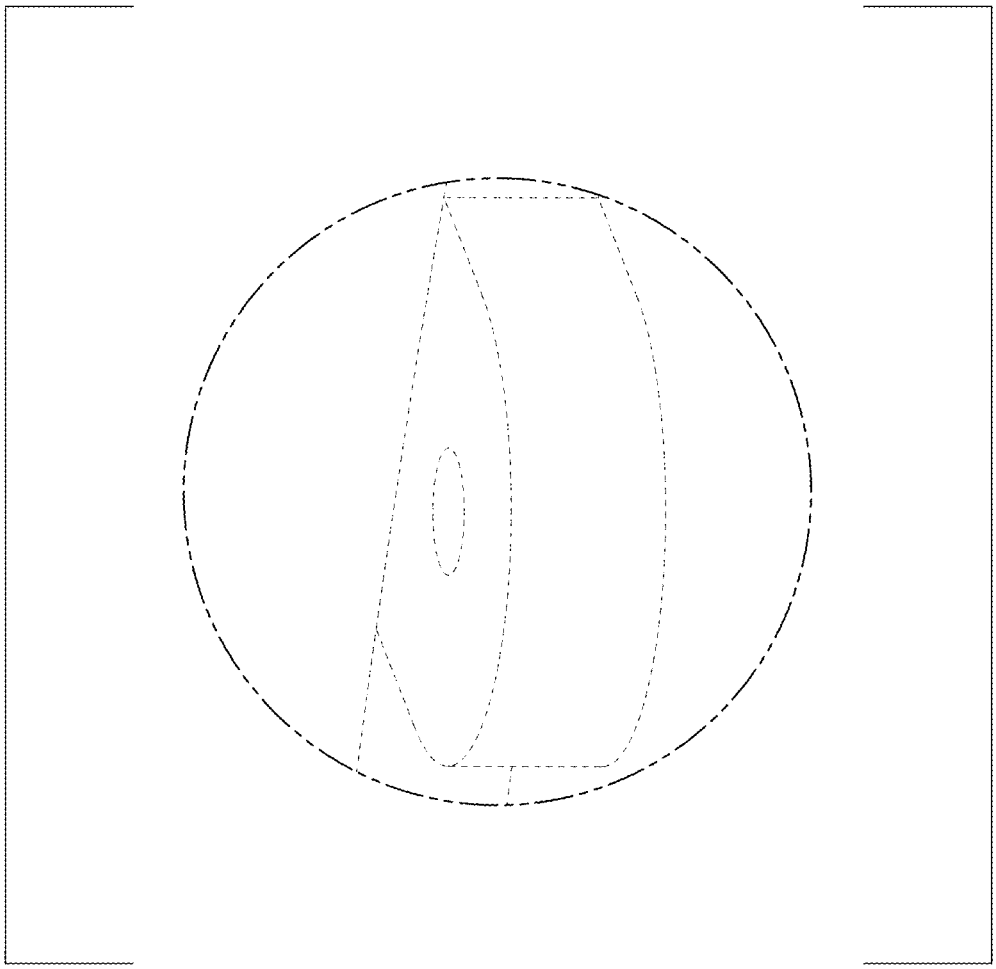

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| 1,941,558 | A * | 1/1934 | Labbe | B65D 5/6614 | 229/125 |
| 5,078,460 | A * | 1/1992 | Holsinger | G06F 1/1628 | 312/282 |
| D370,366 | S * | 6/1996 | Watts | D6/675 | |
| D400,600 | S * | 11/1998 | Ackerman | D21/478 | |
| D439,743 | S * | 4/2001 | DeVance | D3/297 | |
| 6,928,932 | B1 * | 8/2005 | Ferrill | A47B 37/00 | 108/26 |
| 7,552,821 | B1 * | 6/2009 | Demers | A63F 9/1044 | 206/499 |
| D844,714 | S * | 4/2019 | Witze | D21/480 | |
| D977,025 | S * | 1/2023 | Fan | D21/480 | |
| D1,020,919 | S | 4/2024 | Che | | |
| D1,023,169 | S | 4/2024 | Che | | |
| D1,026,104 | S | 5/2024 | Che | | |
| D1,030,900 | S | 6/2024 | Che | | |
| D1,036,556 | S | 7/2024 | Che | | |
| D1,037,362 | S | 7/2024 | Che | | |
| D1,040,241 | S | 8/2024 | Che | | |
| D1,040,930 | S | 9/2024 | Che | | |
| D1,051,233 | S | 11/2024 | Che | | |
| 2009/0200199 | A1 * | 8/2009 | Biglands | A63F 9/10 | 273/157 R |
| 2021/0170267 | A1 * | 6/2021 | Malki | A63F 9/1044 | |
| 2023/0097737 | A1 * | 3/2023 | Che | A47B 13/081 | 108/1 |
| 2023/0293979 | A1 * | 9/2023 | Che | A47B 19/08 | 108/59 |
| 2023/0356068 | A1 * | 11/2023 | Che | A63F 9/1044 | |

* cited by examiner

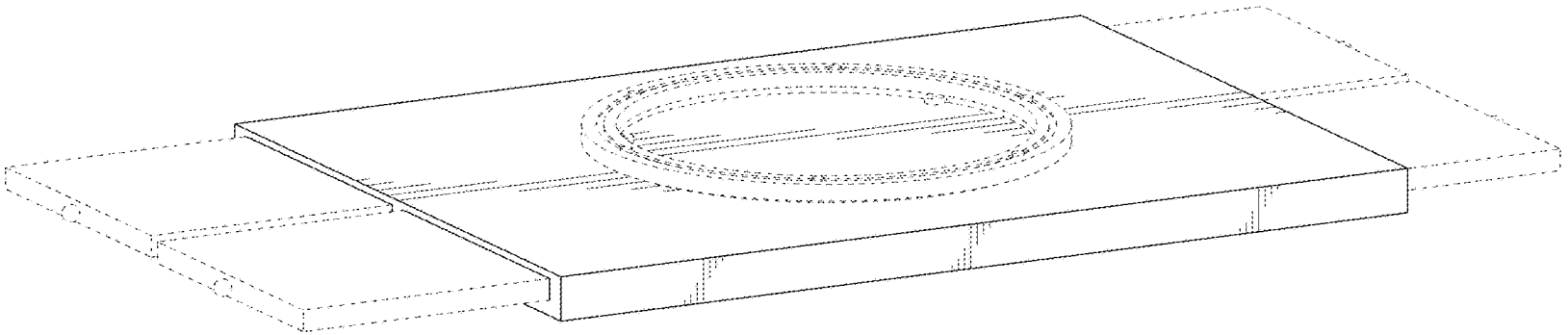
FIG. 1
(Amended)

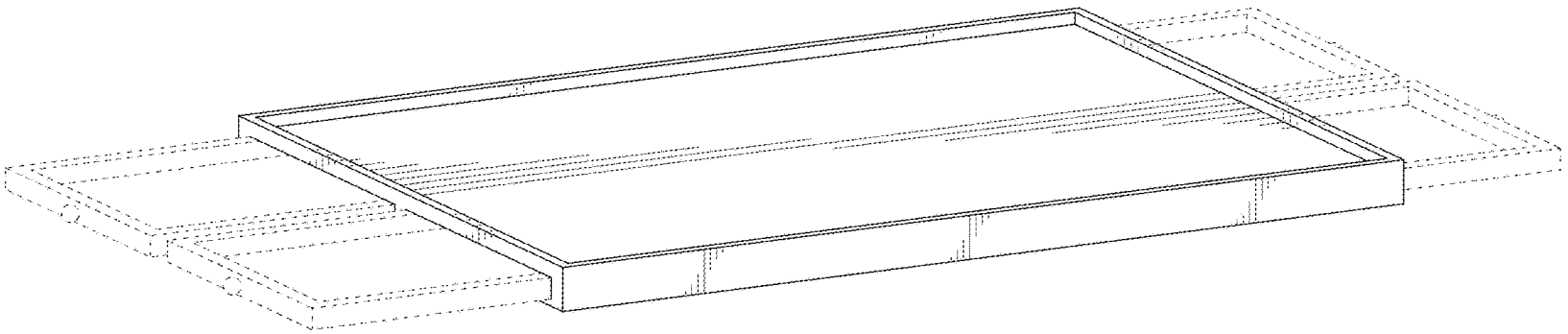
FIG. 2
(Amended)

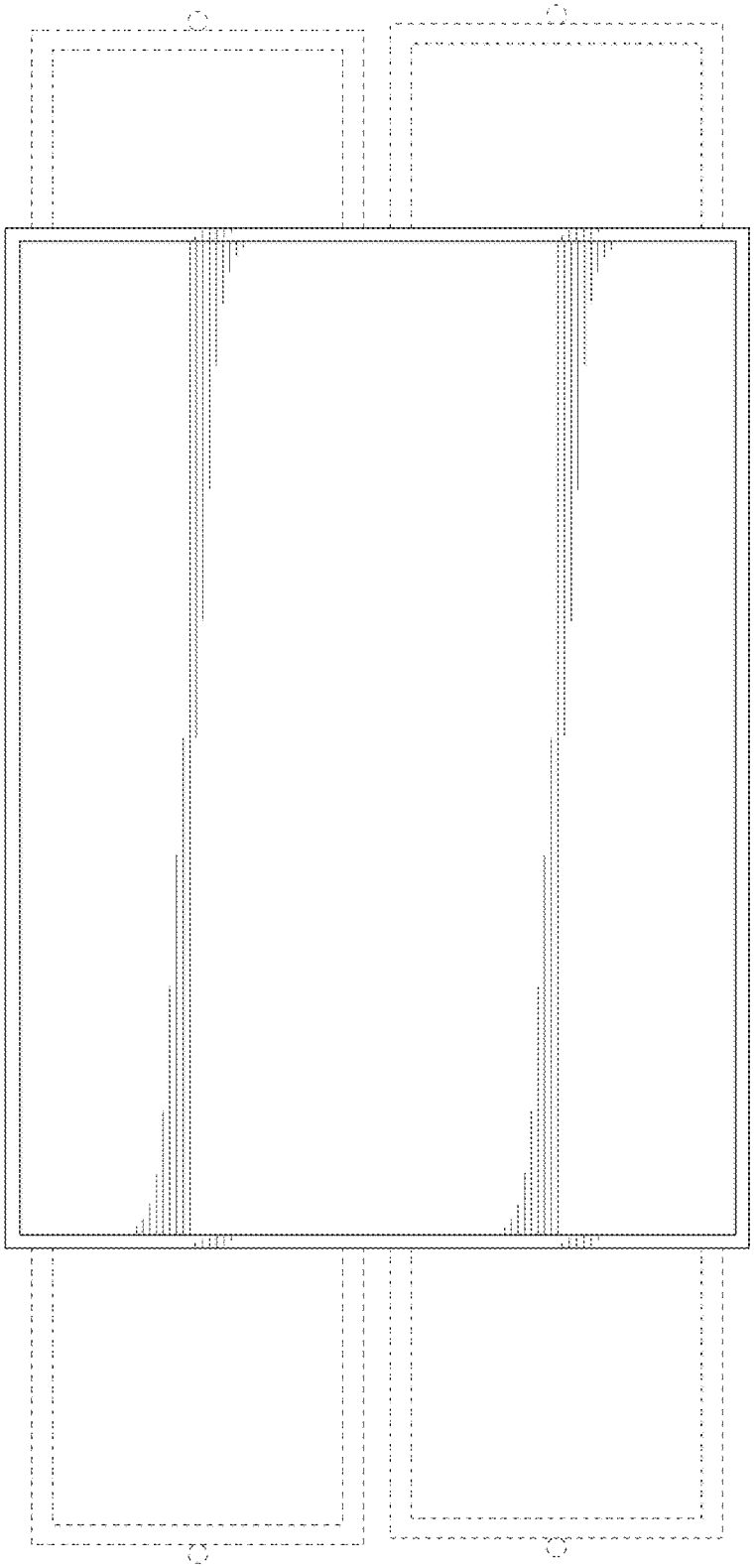
FIG. 3
(Amended)

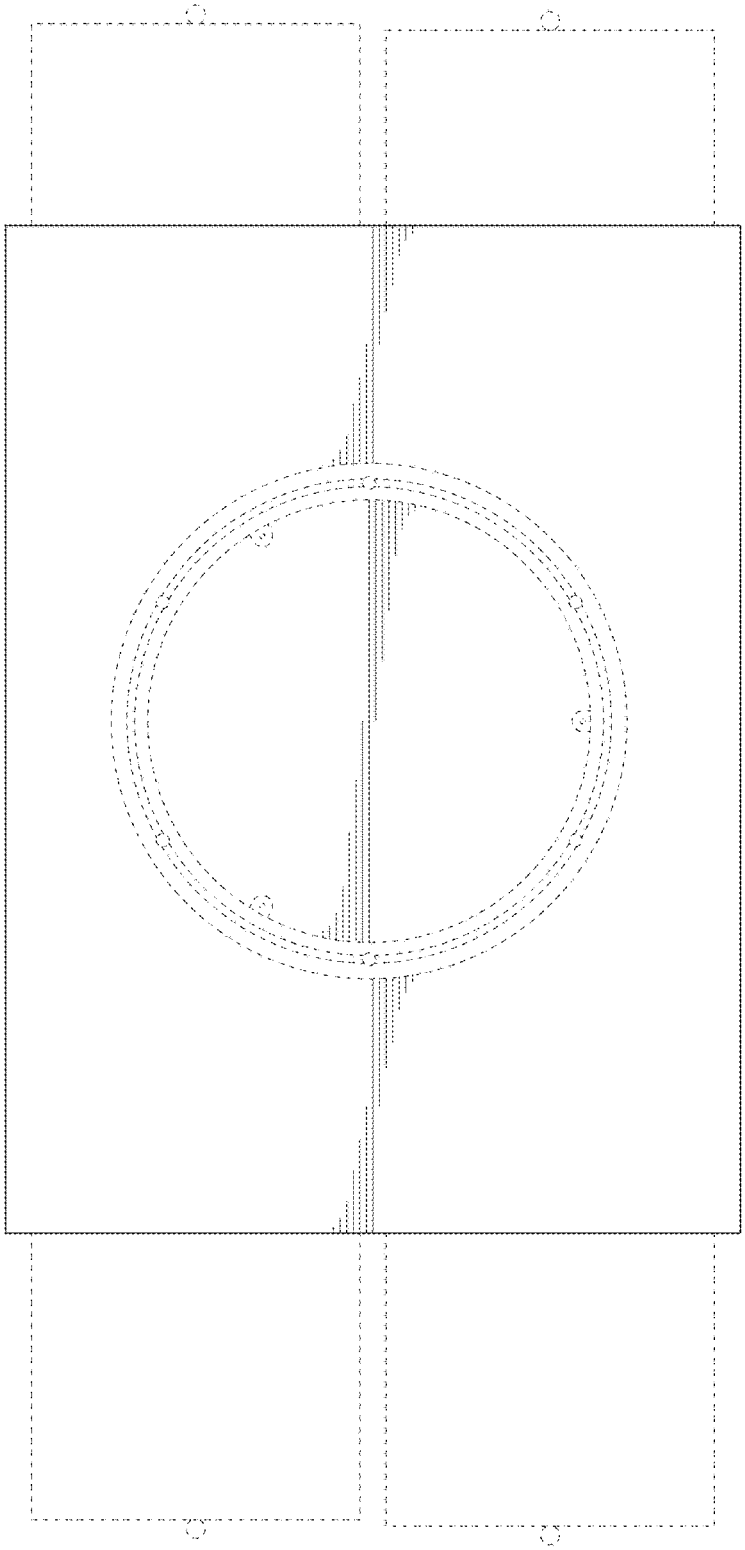
FIG. 4
(Amended)

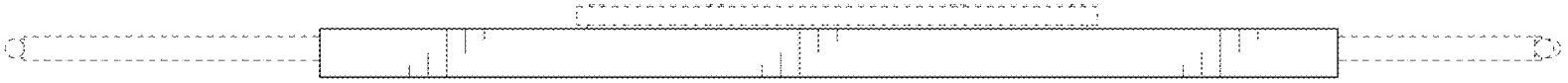
FIG. 5
(Amended)

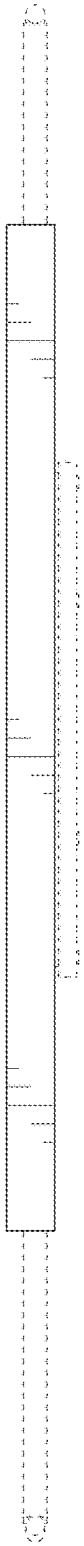
FIG. 6
(Amended)

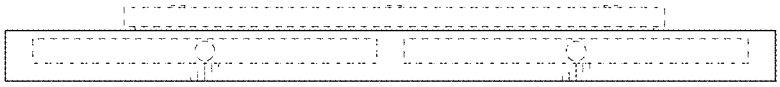
FIG. 7
(Amended)

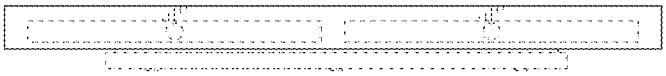
FIG. 8
(Amended)

(Canceled)